United States Patent
Schreiber

(10) Patent No.: US 6,747,881 B2
(45) Date of Patent: Jun. 8, 2004

(54) FREQUENCY CONVERTER

(75) Inventor: Dejan Schreiber, Zirndorf (DE)

(73) Assignee: Semikron Elektronik GmbH, Nuremberg (DE)

(*) Notice: Subject to any disclaimer, the term of this patent is extended or adjusted under 35 U.S.C. 154(b) by 68 days.

(21) Appl. No.: 10/128,979

(22) Filed: Apr. 24, 2002

(65) Prior Publication Data

US 2003/0043603 A1 Mar. 6, 2003

(30) Foreign Application Priority Data

Sep. 4, 2001 (DE) .......................... 101 43 279

(51) Int. Cl.⁷ ............................. H02M 5/458
(52) U.S. Cl. ....................................... 363/37
(58) Field of Search .................. 363/39, 40, 37, 363/56.01

(56) References Cited

U.S. PATENT DOCUMENTS

| | | | | |
|---|---|---|---|---|
| 5,111,374 A | * | 5/1992 | Lai et al. | 363/37 |
| 5,343,079 A | * | 8/1994 | Mohan et al. | 307/105 |
| 5,612,615 A | * | 3/1997 | Gold et al. | 323/360 |
| 5,625,545 A | | 4/1997 | Hammond | |
| 5,793,623 A | * | 8/1998 | Kawashima et al. | 363/56.05 |
| 6,128,204 A | * | 10/2000 | Munro et al. | 363/41 |
| 6,166,513 A | * | 12/2000 | Hammond | 318/764 |
| 6,175,217 B1 | * | 1/2001 | Da Ponte et al. | 322/19 |
| 6,295,216 B1 | * | 9/2001 | Faria et al. | 363/44 |

FOREIGN PATENT DOCUMENTS

| | | |
|---|---|---|
| DE | 196 35 606 A1 | 3/1998 |
| DE | 198 32 225 A1 | 1/2000 |
| DE | 198 32 226 A1 | 1/2000 |

OTHER PUBLICATIONS

Mauri Peltola, Seppo Perala, and, Uno T. Bryfors, ABB Industrial Systems, ACS 600—Antriebe mit direkter Drehmomentregelung, published in *ABB Technik* Jun. 1977, pp. 31–39.

Harold M. Stillman, ABB Corporate Technology, IGCTs—Megawatt–Halbleiterschalter für den Mittelspannungsbereich, published in *ABB Technik* Mar. 1999, pp. 12–17.

Harold M. Stillman, ABB Corporate Technology, 1GCTs—Megawatt–Halbleiterschalter für den Mittelspannungsbereich, published in *ABB Technik* Mar. 1977, pp. 1–9.

* cited by examiner

*Primary Examiner*—Adolf Berhane
(74) *Attorney, Agent, or Firm*—Darby & Darby

(57) ABSTRACT

The invention relates to a frequency converter for an energy flow from a three-phase network to a consumer for medium and high output voltages, with variable frequency, current and voltage outputs, fed from secondary windings of a transformer with one or more cells per output phase (R, S, T). For each output phase, each identical cell has a diode input rectifier circuit, an active harmonic filter, an intermediate-circuit capacitance, and a three-point DC/AC converter on the output side.

6 Claims, 4 Drawing Sheets

FREQUENCY CONVERTER

BACKGROUND

The present invention relates to a frequency converter for an energy flow from a three-phase network to a consumer, for medium and high output voltages, with variable frequency, current and voltage outputs.

We know from the prior art that it is possible to drive three-phase medium voltage motors, i.e., motors for 3×2.2 kV, 3×3.3 kV, 3×4.16 kV, 3×6.3 kV, etc. up to 3×13.8 kV, by synthesizing the three-phase power using high-voltage semiconductors, IGBTs (insulated gate bipolar transistors), or IGCTs (integrated gate communicated transistors), or by cascading, i.e., series-connecting components intended for low voltages.

In those cases, system perturbations as well as motor voltages and motor currents must be taken into account. System perturbations have an effect on the line voltage and must therefore be avoided if possible. The quality of the line voltage is important. The total and individual harmonic factors are of interest for the line voltage. The total harmonic factor is the effective value of the ratio between the total harmonic and the total effective value. The individual harmonic factor is the effective value of the nth order harmonic in relation to the total effective value. The admissible maximum values of these quality parameters are defined in the relevant requirements. This means that the load currents of the medium voltage networks must be at least nearly sinusoidal.

Regarding the motor voltages, the differential quotient dv/dt must not be too high because high voltage and medium voltage motors are very sensitive to high dv/dt quotients, i.e., very fast voltage changes can lead to the destruction of the insulation of high and medium voltage motors. To avoid high dv/dt coefficients, filters are used between the motors and the associated DC/AC converters, for example when high-voltage components are used.

It is known in prior art to use asynchronous DC motors as medium voltage, variable speed drives for pumps, fans, etc. Such drives are not electrically braked, which means that kinetic energy is not fed back into the power grid. These are so-called two-quadrant drives.

DE 198 32 225 A1 discloses a four-quadrant converter for medium and higher voltages which is intended for single-phase or multi-phase consumers to generate outputs of variable amplitudes and frequencies. This converter consists of single-phase direct converter cells with a three-phase input from a transformer, with high-frequency filters and power switches. The single-phase direct converter cells are series-connected and fed via a star point of the corresponding secondary transformer winding. The high-frequency filters in the form of capacitors are delta or star connected with the associated secondary transformer windings. The power switches are bidirectional power semiconductor components or formed from equivalent circuits. In case of a three-phase design, the power outputs of the converter are star or delta connected.

DE 198 32 226 A1 discloses a four-quadrant converter for medium or higher voltages for single-phase and multi-phase consumers for generating outputs of variable amplitudes and frequencies. This converter is fed from a three-phase source of an isolation transformer and consists of a number of single-phase converter cells. The outputs of the single-phase converter cells are series-connected to generate high single-phase voltages and can be designed for the generation of direct current by star or delta connecting the corresponding outputs.

Thus, the two prior-art publications cited above describe high-voltage drives for asynchronous motors.

DE 196 35 606 A1 discloses an arrangement for generating a higher alternating current from several lower voltage direct-current sources. This prior-art arrangement is provided with one or more DC sources, a series connection, and voltage transformers which couple the DC sources to the series connection, which have power switches, and which generate partial voltages of variable width. The power switches are arranged in such a way that the partial voltages can be coupled to the series connection independently of each other. The series connection can be closed regardless of the number of coupled partial voltages. The voltage transformers consist of DC/AC converters generating partial AC voltages. This arrangement is particularly suitable for application in photovoltaic devices, where the DC/AC converters can be used as module-optimizing string converters.

U.S. Pat. No. 5,625,545 and U.S. Pat. No. 6,166,513 describe a two-quadrant AC/AC drive and a method for controlling AC motors. In these references, a multi-phase power transformer is provided with a large number of secondary windings for a large number of power cells. Each power cell has a single-phase output that is controllable via modulation control. The power cells are series-connected to facilitate a maximum output voltage in each cell. In this prior-art drive, the multi-phase power transformer, which is dimensioned for the full drive line, requires a corresponding number of secondary windings with complicated circuitry. Thus, some secondary windings are delta connected, others are star connected, while others are zigzag connected, etc.

Among known applications in the medium voltage range with asynchronous motors, are systems made by the firm of ABB under the name of ACS. For example, the company publication ABB Technik, No.6/1996, pages 31–29, describes AVS 600 drives with direct torque control. This and related systems use an input transformer which is designed for full motor power. These systems have 12-pulse diode rectifiers, intermediate-circuit capacitors, IGBT or IGCT converters and output filters. For example, the converter, which is formed by a voltage impressed converter, is series-connected with several high-voltage IGCTs. IGCTs for the medium voltage range have been described, for example, in the company publication ABB Technik, No. 3/1997, pages 12–17, under the title "IGCTs megawatt semiconductor switch for the medium voltage range".

High-voltage semiconductors, IGBTs and IGCTs have switching power losses that are higher by a factor of 3 to 10 than 1.2 kV and 1.7 kV IGBTs. Although their switching speed is not very fast, the voltage spike dv/dt is very large because the intermediate voltage is high, i.e., several kV. For an intermediate voltage of 100 kV and a switching time of 1 $\mu$s, the dv/dt=100 kV/$\mu$s. Such rapid voltage spikes cannot be tolerated by the windings of motors and/or transformers. To avoid such voltage spikes, additional passive LC filters, designed for fall power, are required at the output. All known solutions, as described above, use an input transformer. Some of these prior-art solutions, such as those of ABB, require output filters. U.S. Pat. No. 5,625,545 and U.S. Pat No. 6,166,513 propose an input transformer for full power, which has very complicated secondary windings, as mentioned above.

OBJECTS AND SUMMARY OF THE INVENTION

It is the object of the present invention to create a frequency converter for energy flow from a three-phase network to a consumer, for medium and high output voltages, with variable frequencies, currents and voltages, wherein the line currents with a symmetrical load of all network phases are at least nearly sinusoidal, whereby nearly sinusoidal load currents with variable outputs are generated, the voltage variation per time unit dv/dt at the output is relatively small to avoid insulation problems, and whereby commercially available highly-effective power semiconductor components can be used.

This object is achieved according to the invention by the characteristics of the invention.

The frequency converter according to the invention has the advantage that the line currents are at least nearly sinusoidal with a symmetrical load of all network phases, that at least nearly sinusoidal load currents with variable outputs of frequency, current and voltage are generated, that the voltage variation per time unit dv/dt at the output of the frequency converter is relatively small, so that insulation problems can be avoided, and that commercially available highly-effective power semiconductor components such as 1.2 kV IGBTs can be used.

The above, and other objects, features and advantages of the present invention, including details, characteristics and advantages will become apparent from the following description read in conjunction with the accompanying drawings, in which like reference numerals designate the same elements.

BRIEF DESCRIPTION OF THE DRAWINGS

FIG. 3 shows a frequency converter arrangement with a large number of cells according to FIG. 1a.

DETAILED DESCRIPTION OF THE PREFERRED EMBODIMENT

Figure 1A:
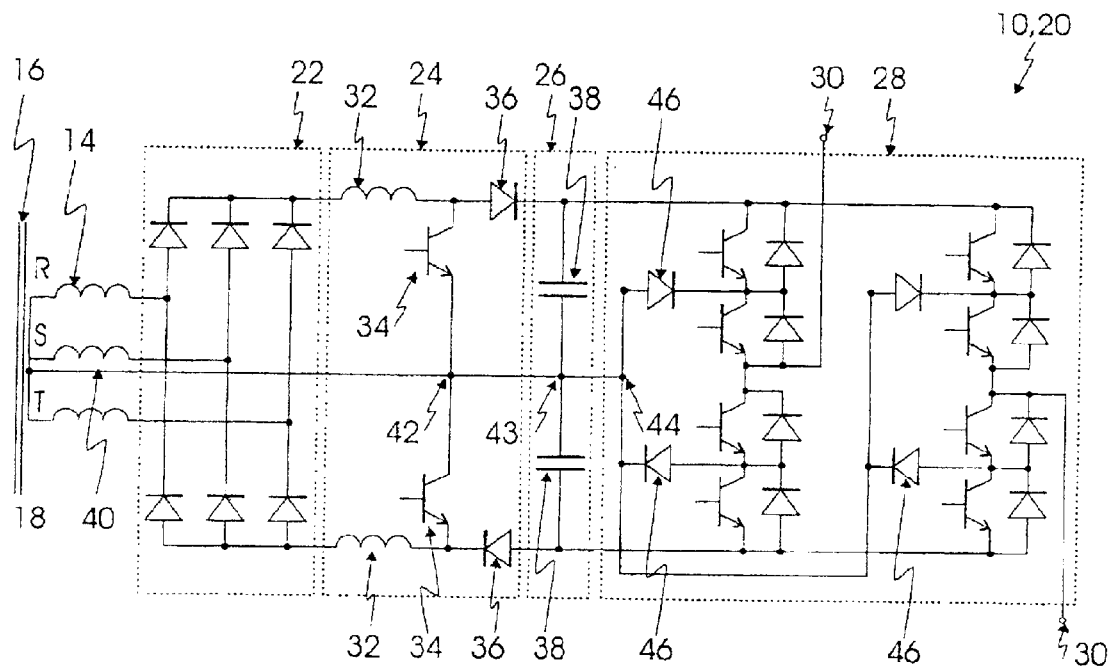
FIG. 1a shows a cell of a frequency converter with a three-phase cell supply.

Referring to FIG. 1a, a cell 20 of a frequency converter 10 supplies energy from a three-phase network to a consumer 12 (see FIG. 3), for medium and high output voltages with variable outputs of frequency, current and voltage. The frequency converter 10 is fed from secondary windings 14 of a transformer 16 whose core is shown schematically by two lines 18. One or more cells 20 are provided per phase fed to the consumer 12. The cells 20 are of identical design. Each cell 20 has a diode input rectifier circuit 22 fed from the three phases of transformer 16. The rectified output of the input rectifier is fed to an active harmonic filter 24 which is also called the power factor corrector (PFC). The active harmonic filter 24, besides contributing to ripple reduction, is also used as a boost converter. An intermediate-circuit capacitance 26 completes the ripple reduction. The resulting DC voltage is applied to a three-point DC/AC converter 28 which produces AC power having desired voltage and frequency characteristics. The resulting AC power is connected to succeeding circuits through outputs 30.

The active harmonic filter 24 has input inductors 32, two series-connected controllable switches 34 and two diodes 36, to generate a sinusoidal line current input with a controllable intermediate-circuit voltage for feeding to the intermediate-circuit capacitance 26. The intermediate-circuit capacitance 26 has two series-connected capacitor groups 38.

The secondary windings 14 of transformer 16 are star connected. A neutral lead 40 of the star connection of the secondary windings 14 of transformer 16 is connected to the center point 43 of the series-connected capacitor groups 38 and via a connection point 44 is connected to the NPC diodes (neutral point clamped diodes) 46 of three-point DC/AC converter 28.

Figure 1B:
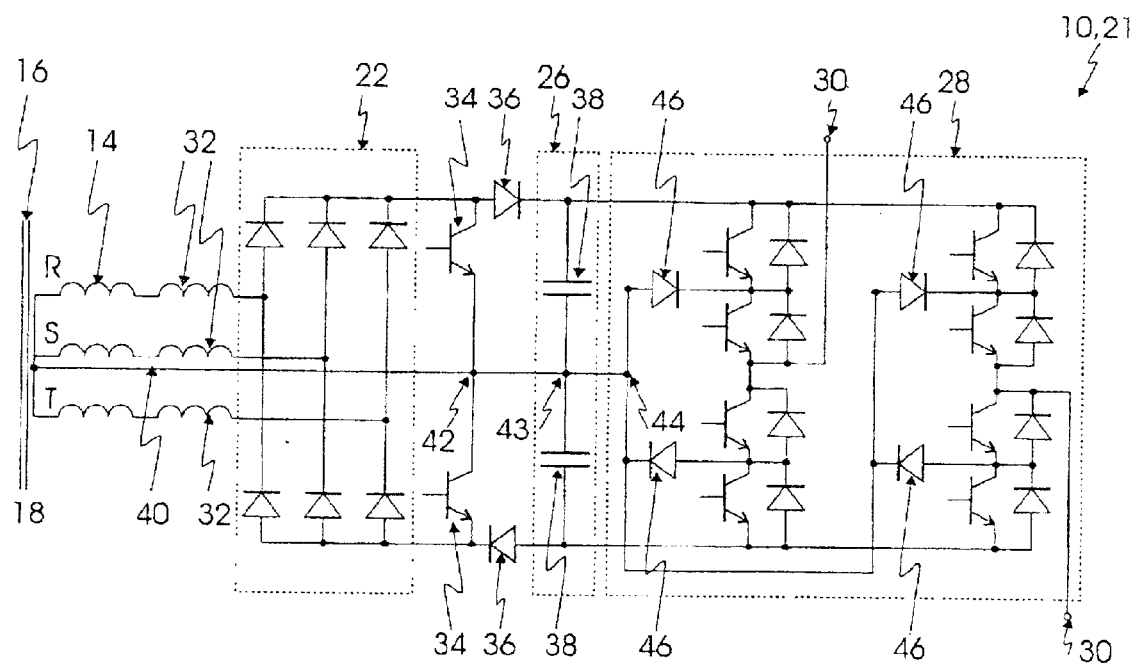
FIG. 1b shows an alternative circuit of a cell of a frequency converter with a three-phase cell supply.

Referring now also to FIG. 1b, the two input inductors 32 of FIG. 1a are connected to the DC output side of the diode input rectifier circuit 22. The active harmonic filter of the cell 21 in FIG. 1b has three input inductors 32 which are series-connected to the secondary windings 14 of transformer 16, i.e., to the AC input side of the diode input rectifier circuit 22.

Figure 2A:
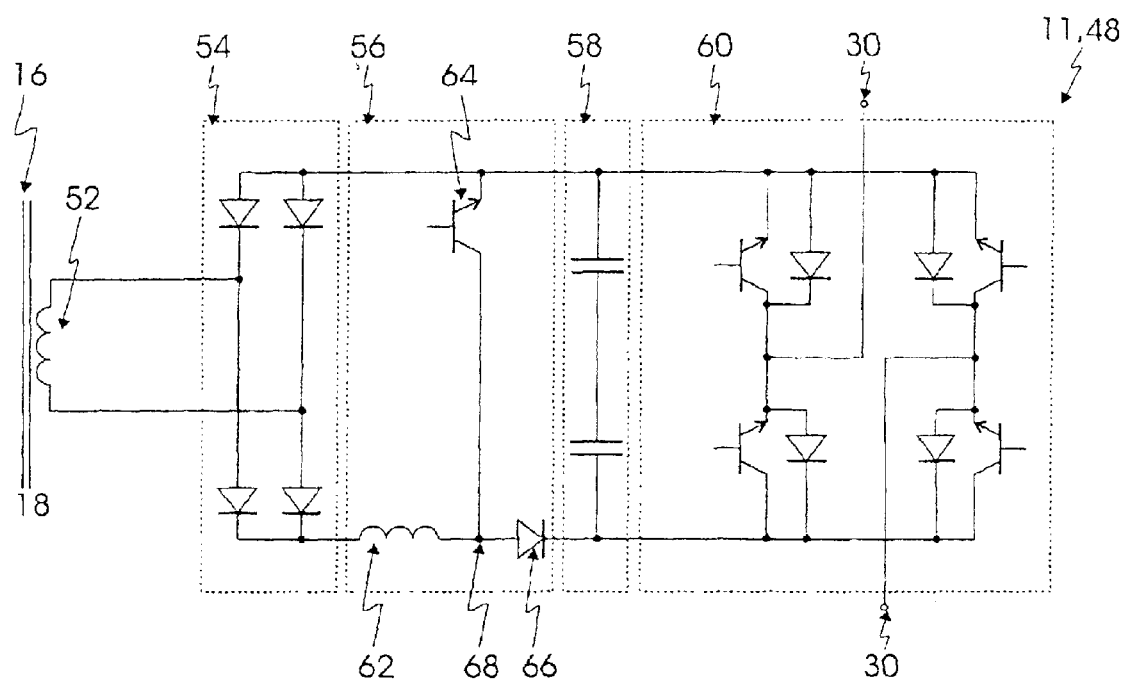
FIG. 2a shows a cell of the frequency converter for a single-phase cell supply.

Referring now to FIG. 2a, a cell 48 for a frequency converter 11 for an energy flow from a three-phase network 50 to a consumer 21 (see FIG. 4) for medium and high output voltages, with variable outputs of frequency, current and voltage, with a single-phase supply in each cell 48. A transformer 16 includes a core 18 and a single-phase secondary winding 52. The secondary winding 52 of transformer 16 is connected to a diode input rectifier circuit 54. The diode input rectifier circuit applies its rectified output to an active harmonic filter 56. The active harmonic filter 56 is connected to an intermediate capacitance 58. Cell 48 also has a DC/AC converter 60 on its output side. The input of the DC/AC converter is connected to intermediate capacitance 58. The output of the DC/AC converter 60 is applied to outputs 30.

The active harmonic filter 56 has an input inductor 62, a controllable switch 64 and a diode 66 for generating a controllable intermediate-circuit voltage to be fed to the intermediate-circuit capacitance 58.

According to FIG. 2a, the input inductor 62 is connected to the DC output side of the diode input rectifier circuit 54. Input inductor 62 is series-connected with diode 66. The controllable switch 64 is connected to the center point 68 of the series connection of input inductor 62 and diode 66.

Figure 2B:
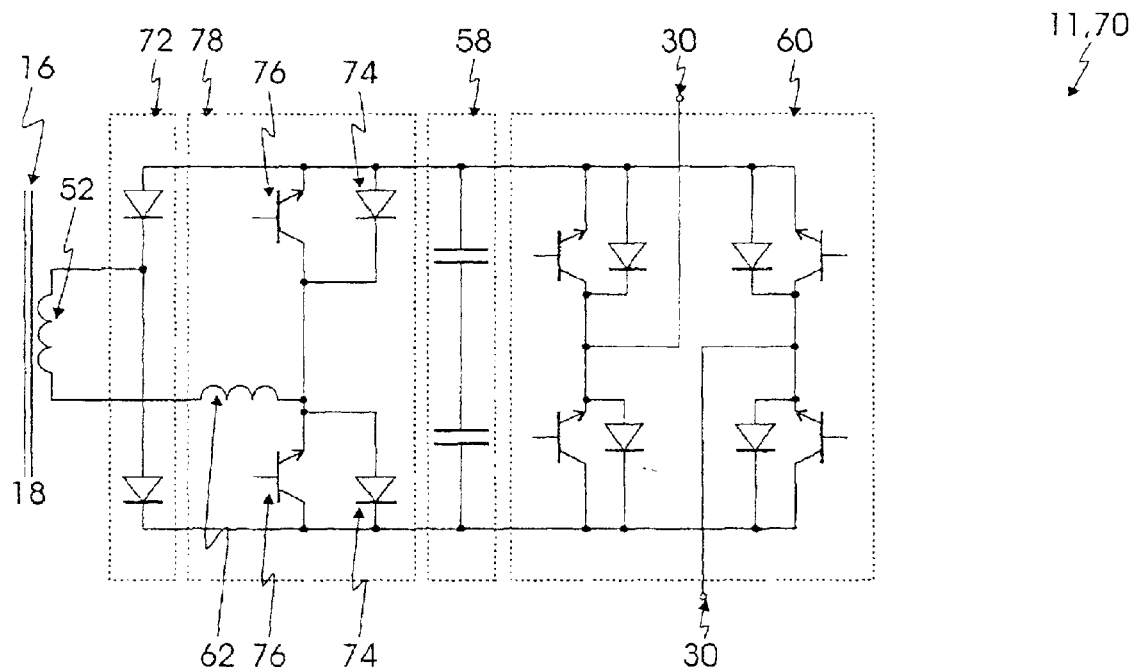
FIG. 2b shows an alternative circuit of a cell for a single-phase cell supply.

Referring now to FIG. 2b, a cell 70 differs from cell 48 of FIG. 2a mainly in that input inductor 62 is connected to the AC input side of the diode input rectifier circuit 72. In addition to input inductor 62, the active harmonic filter 78 also has two diodes 74 and two controllable switches 76. The controllable switches 76 are connected back to back to two diodes 74. Otherwise, cell 70 according to FIG. 2b is connected the same way as cell 48 according to FIG. 2a, i.e., connected to the active harmonic filter 78 is an intermediate capacitance 58 which is connected to a DC/AC converter 60 on the output side. Reference number 30 in FIGS. 2a and 2b also indicates the outputs of DC/AC converter 60 on the output side.

Figure 3:
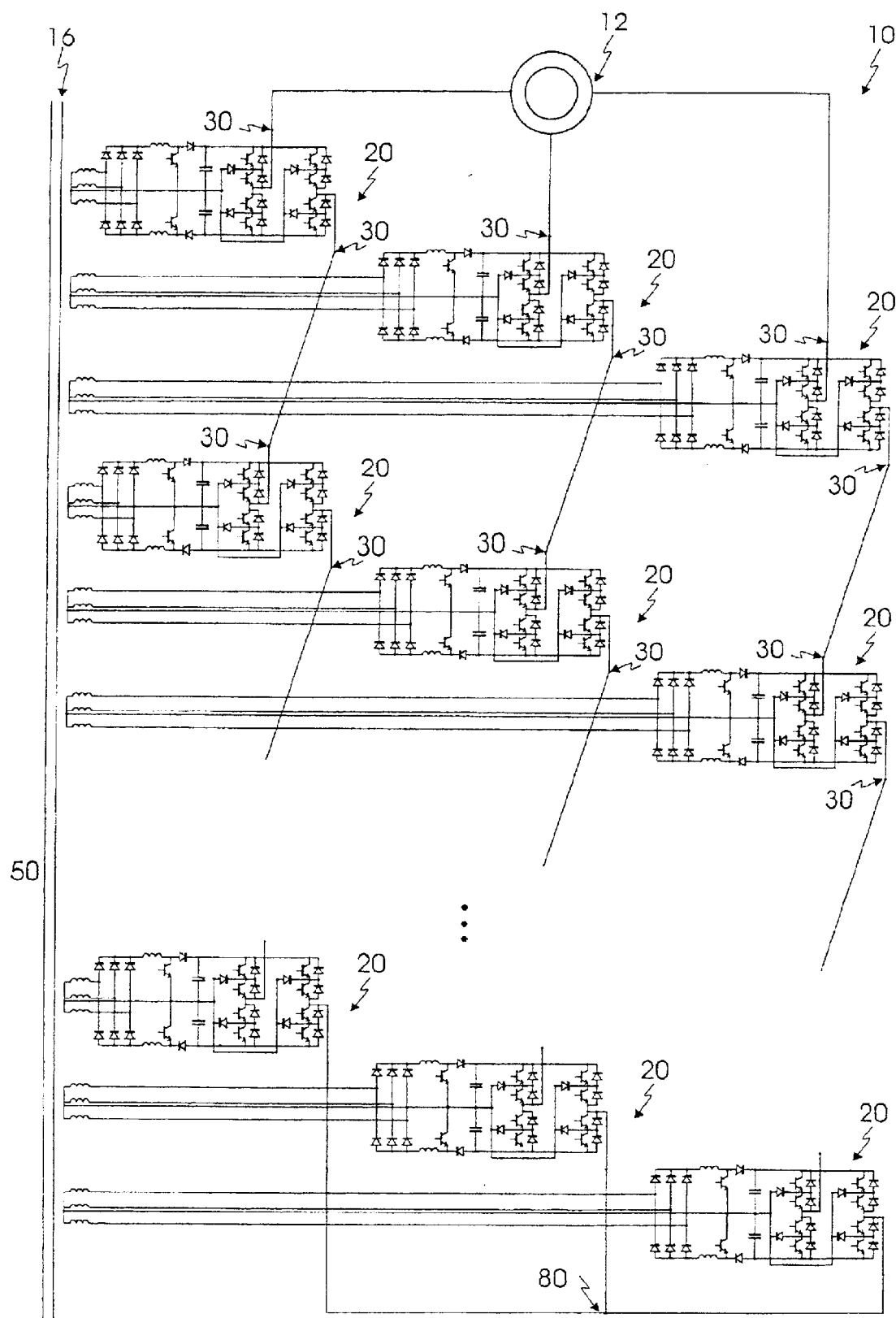

Referring now to FIG. 3, a frequency converter 10 feeds energy from a three-phase network 50 to a consumer 12. The frequency converter 10 employs cells 20 as shown in FIG. 1a. Each identical cell 20 is connected to three secondary windings of transformer 16. The outputs 30 of cells 20 are interconnected in columns. The columns are connected to a common star point 80 (see bottom of FIG. 3).

Figure 4:
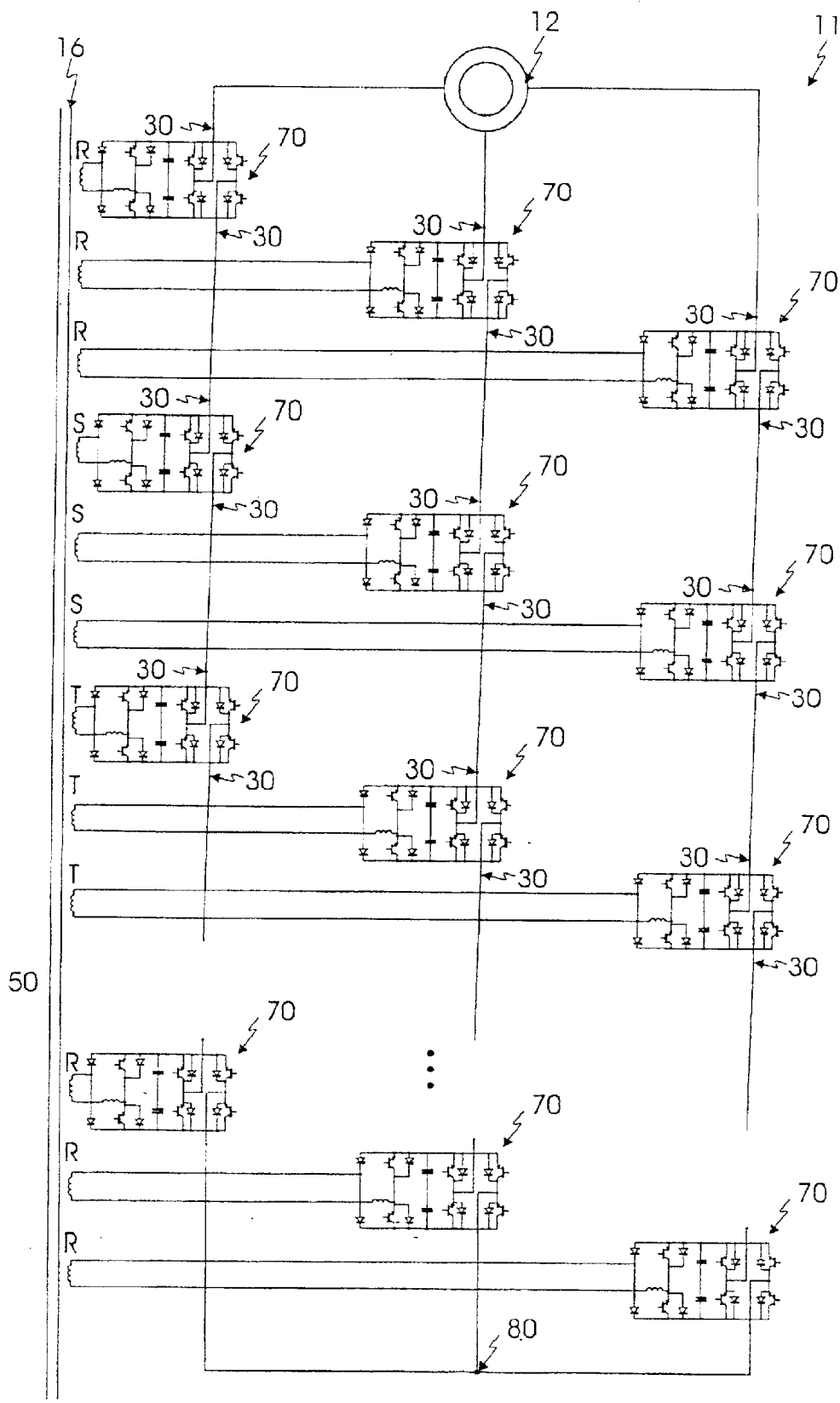
FIG. 4 shows a frequency converter arrangement with a large number of cells according to FIG. 2b.

Referring now to FIG. 4, a frequency converter 11 feeds energy from a network 50 to a consumer 12. The frequency converter 11 includes the identical cells 70 as shown in FIG.

2b. Each identical cell 70 is connected to a corresponding secondary winding of transformer 16. The three AC phases are referred to as R, S and T. The outputs 30 of cells 70 are interconnected in columns. The columns are connected to a common star point 80. Three cells 70 of a phase of consumer 12, fed by the three AC phases R, S, T, have the same function in frequency converter 11 in FIG. 4 as one cell 20 in frequency converter 10 in FIG. 3.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A Frequency converter for converting energy flow from a three-phase network to a three-phase consumer supply at variable frequency, current and voltage outputs, comprising:
   at least one cell per phase of said three-phase consumer supply;
   all of said cells being identical;
   each of said cells includes:
      a diode input rectifier circuit;
      an active harmonic filter;
      an intermediate-circuit capacitance;
      a three-point DC/AC converter on an output side;
      said DC/AC converter comprising NPC diodes;
      said active harmonic filter includes at least two input inductors, at least two series-connected controllable switches and at least two diodes for receiving sinusoidal line current input and for generating a controllable intermediate-circuit voltage for said intermediate-circuit capacitance;
      said intermediate-circuit capacitance has two series-connected capacitor groups; and
      a neutral lead of a star circuit formed from said secondary windings is connected to a central point of said series-connected controllable switches, a center point of said series-connected capacitor groups and said NPC diodes of said three-point DC/AC converter.

2. A frequency converter according to claim 1, wherein said active harmonic filter includes two input inductors connected to a DC output side of said diode input rectifier circuit.

3. Frequency converter according to claim 1, wherein said active harmonic filter includes three input inductors which are series-connected to said secondary windings of said transformer and an AC input side of said diode input rectifier circuit.

4. A Frequency converter for an energy flow from a three-phase network to a consumer with variable frequency, current and voltage outputs, comprising:
   an input transformer;
   means for feeding said energy to secondary windings of said transformer;
   at least three identical cells connected to said secondary winding of each phase of said three-phase network;
   said cell comprising:
      a diode input rectifier circuit;
      an active harmonic filter;
      an intermediate-circuit capacitance;
      a DC/AC converter on an output side;
   wherein an output of said DC/AC converter for said at least three identical cells for each phase are serially interconnected, and said serially connected DC/AC converter outputs for each phase are connected to a common star point:
   said active harmonic filter includes:
      an input inductor;
      at least one controllable switch;
      at least one diode for receiving a sinusoidal line current input and for generating a controllable intermediate-circuit voltage for said intermediate-circuit capacitance.

5. A frequency converter according to claim 4, wherein said input inductor is connected to a DC output side of said diode input rectifier circuit and said active harmonic filter includes a diode and a controllable switch;
   and said diode is series-connected to said input inductor and said controllable switch is connected to a center point of said series-connected inductor and diode.

6. Frequency converter according to claim 4, wherein said input inductor is connected to an AC input side of said diode input rectifier circuit, and said active harmonic filter includes two controllable switches connected back to back to two diodes.

* * * * *

UNITED STATES PATENT AND TRADEMARK OFFICE
CERTIFICATE OF CORRECTION

PATENT NO. : 6,747,881 B2
DATED : June 8, 2004
INVENTOR(S) : Dejan Schreiber

It is certified that error appears in the above-identified patent and that said Letters Patent is hereby corrected as shown below:

<u>Title page,</u>
Item [73], Assignee, please delete "Semikron Elektronik GmbH, Nuremberg (DE)" and substitute -- Semikron Elektronik GmbH, Nurnberg (DE) --.

Signed and Sealed this

Twenty-third Day of November, 2004

JON W. DUDAS
*Director of the United States Patent and Trademark Office*